(12) United States Patent
Quan et al.

(10) Patent No.: US 9,451,579 B2
(45) Date of Patent: Sep. 20, 2016

(54) POSITIONING INFORMATION DETERMINATION METHOD AND DEVICE

(71) Applicant: China Academy of Telecommunications Technology, Beijing (CN)

(72) Inventors: Haiyang Quan, Beijing (CN); Jing Liang, Beijing (CN); Xin Su, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 14/414,038

(22) PCT Filed: Jul. 10, 2013

(86) PCT No.: PCT/CN2013/079136
§ 371 (c)(1),
(2) Date: Jan. 9, 2015

(87) PCT Pub. No.: WO2014/008859
PCT Pub. Date: Jan. 16, 2014

(65) Prior Publication Data
US 2015/0173038 A1 Jun. 18, 2015

(30) Foreign Application Priority Data

Jul. 10, 2012 (CN) .......................... 2012 1 0238422
Jul. 9, 2013 (CN) .......................... 2013 1 0286796

(51) Int. Cl.
*H04W 24/00* (2009.01)
*H04W 64/00* (2009.01)
(Continued)

(52) U.S. Cl.
CPC .............. *H04W 64/006* (2013.01); *G01S 3/04* (2013.01); *G01S 5/12* (2013.01); *H04W 64/00* (2013.01)

(58) Field of Classification Search
CPC ..... H04W 64/006; H04W 64/00; G01S 3/04; G01S 5/12

USPC ........... 455/456.5, 456.6, 456.1, 404.2, 450, 455/562.1
See application file for complete search history.

(56) References Cited

U.S. PATENT DOCUMENTS 7,398,086 B2 7/2008 Morgand et al.
2003/0003924 A1 1/2003 Lin
(Continued)

FOREIGN PATENT DOCUMENTS

CN 102307387 1/2012
WO WO-98/19488 5/1998

OTHER PUBLICATIONS

Catt, UE Positioning Based on AoA+TA for LTE Rel-9, 3GPP TSG RAN WG1 meeting #56, R1-090936, Athens, Greece, Feb. 9-13, 2009.
(Continued)

*Primary Examiner* — Dhaval Patel
(74) *Attorney, Agent, or Firm* — Foley & Lardner LLP; James F. Ewing; Paul M. H. Pua (57) ABSTRACT

An embodiment of the present application relates to the technical field of wireless communications, in particular to a positioning information determination method and device, for solving the problem of large positioning result errors in the prior art due to the fact that existing positioning methods cannot acquire the height difference between a UE and a base station. The positioning information determination method provided in the embodiment of the present invention comprises: a base station receives an uplink signal from a UE; and the base station determines the angle of arrival, beam declination angle and timing advance of the UE according to the received uplink signal. By determining the angle of arrival, beam declination angle and timing advance of a UE according to the received uplink signal, the base station determines the height difference between the UE and the base station according to the beam declination angle, thus reducing positioning result error and improving positioning precision.

14 Claims, 6 Drawing Sheets

(51) Int. Cl.
*G01S 5/12* (2006.01)
*G01S 3/04* (2006.01)

(56) References Cited

U.S. PATENT DOCUMENTS

| | | | |
|---|---|---|---|
| 2006/0009236 A1 | 1/2006 | Bose et al. | |
| 2012/0015669 A1 | 1/2012 | Qin et al. | |
| 2012/0258733 A1* | 10/2012 | Fischer | H04W 4/20 455/456.11 |
| 2012/0302254 A1* | 11/2012 | Charbit | H04W 4/005 455/456.1 |
| 2013/0130706 A1* | 5/2013 | Halbauer | H04W 88/08 455/450 |

OTHER PUBLICATIONS

International Search Report for PCT/CN2013/079136 mailed Oct. 17, 2013.

Extended European Search Report for EP Application No. 13816508.9 mailed Sep. 24, 2015.

Catt: "UE Positioning Based on AoA+TA for LTE Rel-9", 3GPP Draft; R1-090936, 3rd Generation Partnership Project (3GPP}, Mobile Competence Centre ; 650, Route Des Lucioles ; F-06921 Sophia-Antipolis Cedex, France, no. Athens, Greece; 20090204, Feb. 4, 2009, XP050318776, [retrieved on Feb. 4, 2009].

* cited by examiner

POSITIONING INFORMATION DETERMINATION METHOD AND DEVICE

The present application is a US National Stage of International Application No. PCT/CN2013/079136, filed Jul. 10, 2013, designating the United States, and claiming the benefits of Chinese Patent Application No. 201210238422.3, filed with the Chinese Patent Office on Jul. 10, 2012 and entitled "Method of and apparatus for determining position information", and Chinese Patent Application No. 201310286796.7, filed with the Chinese Patent Office on Jul. 9, 2013 and entitled "Method of and apparatus for determining position information", both of which are hereby incorporated by reference in their entireties.

FIELD

The present invention relates to the field of wireless communications and particularly to a method of and apparatus for determining position information.

BACKGROUND

Positioning functions can provide a user with various services, e.g., working, entertainment, daily life, etc. Typical location services include assistance services, e.g., an emergent medical service, an emergent location service, etc.; location-based information services, e.g., a search for information about proximate restaurants and entertainment sites, an inquiry throughout a yellow page, etc.; and advertisement services, e.g., promotion and discount information; and also location-based billing, tracking or other services.

In a positioning as per a cell_ID (the ID stands for an identifier) method, which is a method of positioning based upon cell coverage, the location of a target UE is estimated from known geographical information about a serving cell, where the information about the serving cell can be obtained through calling, paging, Tracking Area (TA) updating or otherwise.

In a method of positioning as per a Timing Advance (TA) and an Angle of Arrival (AoA), a timing advance, an angle of arrival and other factors have been taken into account in addition to the method of positioning as per a cell_ID for the purpose of more precise positioning.

Figure 1:
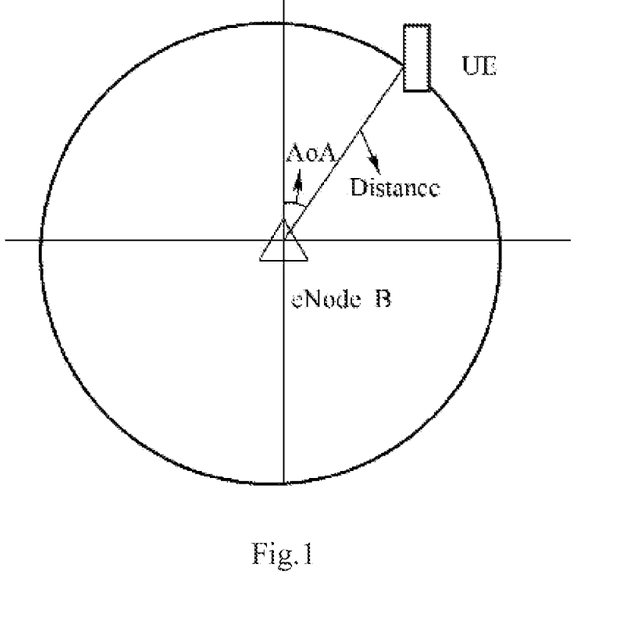
FIG. 1 illustrates a schematic diagram of the principle of positioning as per a TA plus an AOA in the prior art.

An evolved Node B (eNB) obtains the AoA of a signal transmitted by a User Equipment (UE) over an intelligent antenna, where the UE is located on a radial line which starts at the eNB and which is rotated clockwise from the exact north by an angle which is the AoA; and The TA can be calculated as the difference, reported by the UE, between the time when the signal is received and the time when the signal is transmitted by the UE, plus the difference, measured by the eNB, between the time when the signal is received and the time when the signal is transmitted (the TA calculated this way is referred to as a TA Type 1), or can be measured by the eNB in a dedicated random access procedure (the TA calculated this way is referred to as a TA Type 2). The TA is multiplied by the velocity of light divided by two represents the distance between the UE and the eNB, where the UE is located on a circle centered at the eNB and with the distance between the UE and the eNB as a radius. Furthermore position information about the UE can be derived from angle information of the AOA. As illustrated in FIG. 1:

The method of positioning as per a TA plus an AoA is typically applicable only to network-based positioning primarily for the reason that the AoA can only be measured by the eNB and the TA Type 1 and the TA Type 2 are also calculated or measured by the eNB, that is, all the measured quantities involved in this method of positioning are provided by the eNB. All of these measured quantities can be provided by the eNB to a location server, so the support of network-based positioning can accommodate the purpose of positioning. Thus an accompanying advantage of this method lies in that a UE for which no location service is supported can also be positioned in this method.

However with the existing methods of positioning, the difference in altitude between the UE and the eNB may not be available, thus resulting in a significant error in a result of positioning.

SUMMARY

Embodiments of the invention provide a method of and apparatus for determining position information so as to address the problem in the prior art of a significant error in a result of positioning due to the unavailable difference in altitude between a UE and an eNB.

An embodiment of the invention provides a method of determining position information, the method including:

an eNB receiving an uplink signal from a UE; and the eNB determining an angle of arrival, a downtilt angle of beam and a timing advance of the UE from the received uplink signal.

An embodiment of the invention provides another method of determining position information, the method including:

a location server transmitting a measurement request message to an eNB to request for a measurement of a downtilt angle of beam; and the location server receiving an angle of arrival, the downtilt angle of beam and a timing advance of a UE from the eNB.

An embodiment of the invention provides an eNB for determining position information, the eNB comprising:

a receiving module configured to receive an uplink signal from a UE; and a processing module configured to determine an angle of arrival, a downtilt angle of beam and a timing advance of the UE from the received uplink signal.

An embodiment of the invention provides a location server for determining position information, the location server including:

a transmitting module configured to transmit a measurement request message to an eNB to request for a measurement of a downtilt angle of beam; and a determining module configured to receive an angle of arrival, the downtilt angle of beam and a timing advance of a UE from the eNB.

The eNB determines the angle of arrival, the downtilt angle of beam and the timing advance of the UE from the received uplink signal and further determines the difference in altitude between the UE and the eNB from the downtilt angle of beam to thereby lower the error in the result of positioning and improve the precision of positioning.

DETAILED DESCRIPTION

Figure 2:
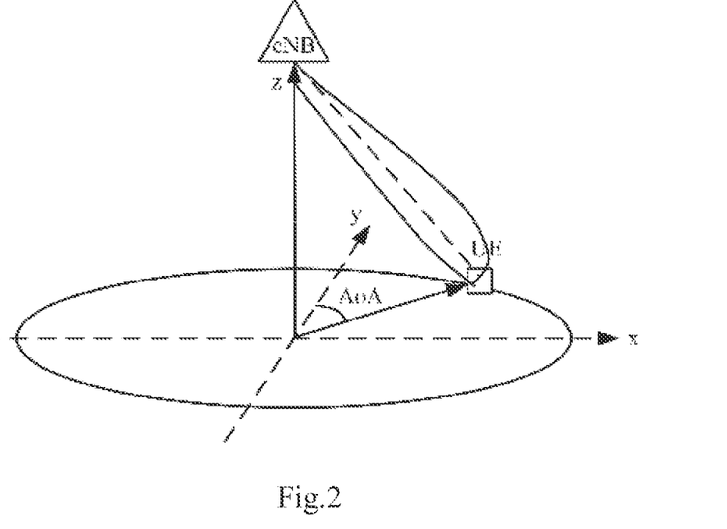
FIG. 2 illustrates a schematic diagram of 3D beamforming in the prior art.

Original 2D beam-forming is performed in a plane. In order to improve the precision of positioning, positioning can be performed in the three-dimension space of x, y and z in embodiments of the invention, as illustrated in FIG. 2. Two-dimension beam-forming is equivalent to beam-forming in the x-y planes, i.e., toward the UE, the AoA is the angle of the direction to the y axis. The z-axis dimension is introduced to the 3D beam-forming model, and beam-forming is performed in the plane perpendicular to the x-y plane, i.e., the direction denoted by the dotted line from the eNB to the UE.

In the embodiments of the invention, the eNB determines the angle of arrival, the downtilt angle of beam and the timing advance of the UE from a received uplink signal. The eNB determines the angle of arrival, the downtilt angle of beam and the timing advance of the UE from the received uplink signal and further determines the difference in altitude between the UE and the eNB from the downtilt angle of beam to thereby lower an error in a result of positioning and improve the precision of positioning.

In an implementation, the distance of the UE to the eNB is an inclined line so that the difference in altitude is the distance multiplied by cos (Downtilt Angle Of Beam) and the horizontal distance of the projection of the user equipment to the eNB is the distance multiplied by sin (Downtilt Angle Of Beam). Without the downtilt angle taking into account, the inclined line can be considered as the horizontal distance of the user equipment to the eNB so that the longitude and the latitude may be calculated by calculating the distances in longitude and latitude larger.

The embodiments of the invention can be applicable to a Long Term Evolution (LTE) system or can be applicable to a Universal Mobile Telecommunication System (UMTS) or can be applicable to another system for which positioning is desirable.

The embodiments of the invention will be described below in further details with reference to the drawings.

Figure 3:
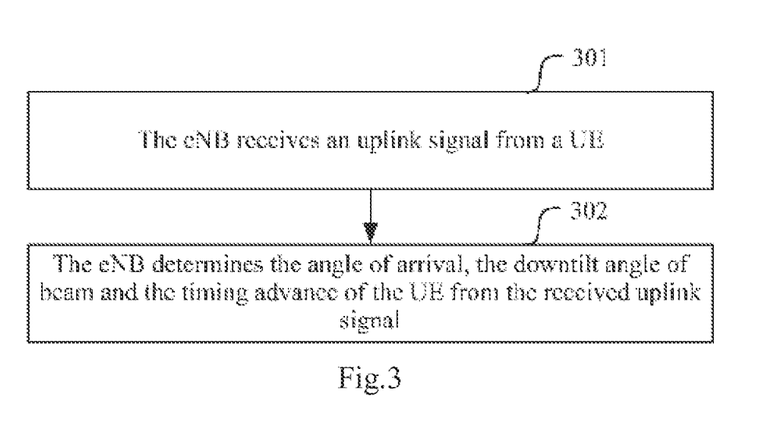
FIG. 3 illustrates a schematic flow chart of a method of determining position information by an eNB according to an embodiment of the invention.

As illustrated in FIG. 3, a method of determining position information by an evolved Node B (eNB) according to an embodiment of the invention includes the following operations:

In the operation 301, the eNB receives an uplink signal from a User Equipment (UE); and In the operation 302, the eNB determines the angle of arrival, the downtilt angle of beam and the timing advance of the UE from the received uplink signal.

Figure 4:
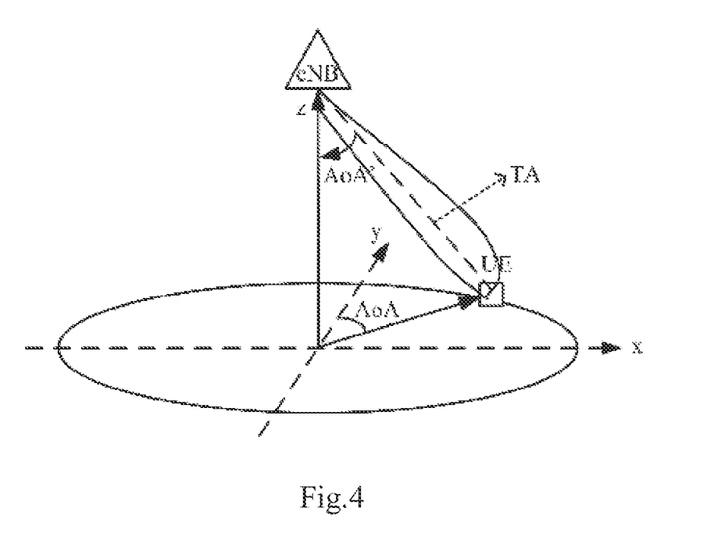
FIG. 4 illustrates a schematic diagram of a measurement in 3D beam-forming assisted positioning according to an embodiment of the invention.

Reference can be made to FIG. 4 for the downtilt angle of beam of the user equipment. In FIG. 4, the AoA' represents the downtilt angle of beam and the AoA represents the angle of arrival.

In an implementation, the eNB can determine the downtilt angle of beam of the user equipment from the received uplink signal in a number of approaches, several of which will be listed below.

In a first approach, the downtilt angle of beam is calculated from an uplink channel measurement.

The eNB may determine the downtilt angle of beam from a measurement on an uplink channel.

It is assumed that an array of antennas of the eNB includes M rows by N columns of antennas, where the total number of elements in the array is $N_R = M \times N$; and the UE is configured with a single transmit antenna to transmit a signal (if the UE is configured with a plurality of transmit antennas, then any one of the transmit antennas can be selected for calculation), and the eNB can derive an uplink channel matrix $H = (H_1, \ldots, H_N)^*$ from an uplink reference signal transmitted by the UE, where $H_i$ the i-th column of the channel matrix $(H_1, \ldots, H_N)$, and $(\bullet)^*$ represents conjugation.

The eNB can determine the downtilt angle of beam in Equation 1 of $$AoA' = \max_{\theta} \sum_{i=1}^{N} |A(\theta) \cdot H_i|^2; \qquad \text{Equation 1}$$

Where AoA' represents the downtilt angle of beam; $A(\theta)$ represents a directional vector corresponding to the downtilt angle of beam, and $$A(\theta) = \left(1, e^{-j\frac{2\pi d \sin(\theta)}{\lambda}}, \ldots, e^{-j\frac{2\pi d(M-1)\sin(\theta)}{\lambda}}\right)_{1 \times m},$$

where the subscript 1×M represents a vector of one row by M columns, M represents the number of rows of antennas in the array of antennas, N represents the number of columns of antennas in the array of antennas, and d represents the distance between vertical array elements in the array of antennas of the eNB, that is, the downtilt angle of beam is the value of the angel corresponding to $$\sum_{i=1}^{N} |A(\theta) \cdot H_i|^2$$

taking the maximum thereof and can be solved particularly as in the prior art, so a repeated description thereof will be omitted here.

In a second approach, the downtilt angle of beam is calculated from a Pre-coding Matrix Indicator (PMI) feedback.

The eNB may determine the downtilt angle of beam from a measurement of the PMI feedback.

If a codebook based feedback scheme is adopted for the system, then the number of ports of a downlink reference symbol is $N_R = M \times N$ corresponding to a virtual array of antenna of M rows by N columns. The UE calculates from a measurement of the downlink reference symbol and reports the PMI, where the PMI is a corresponding precoding matrix in a 3D-MIMO codebook; or The eNB can determine the downtilt angle of beam in Equation 2 of:

$$AoA' = \max_{\theta} \sum_{i=1}^{N} |A(\theta) \cdot W_i|^2; \quad \text{Equation 2}$$

Where AoA' represents the downtilt angle of beam; A(θ) represents a directional vector corresponding to the downtilt angle of beam, and $$A(\theta) = \left(1, e^{-j\frac{2\pi d \sin(\theta)}{\lambda}}, \ldots, e^{-j\frac{2\pi d(M-1)\sin(\theta)}{\lambda}}\right)_{1 \times M},$$

where the subscript 1×M represents a vector of one row by M columns, M represents the number of rows of antennas in the virtual array of antennas, N represents the number of columns of antennas in the virtual array of antennas, and d represents the distance between vertical array elements in the array of antennas of the eNB; and $W_i$ represents the i-th vertical dimension PMI reported by the UE, and $W_i$ is an M×1 vector, that is, the downtilt angle of beam is the value of the angel corresponding to $$\sum_{i=1}^{N} |A(\theta) \cdot H_i|^2$$

taking the maximum thereof and can be solved particularly as in the prior art, so a repeated description thereof will be omitted here.

It shall be noted that the embodiment of the invention will not be limited to the two schemes above to determine the downtilt angle of beam but any scheme similar or equivalent thereof or other schemes in which the downtilt angle of beam can be determined from a measurement on an uplink channel can be applicable to the embodiment of the invention.

Figure 5:
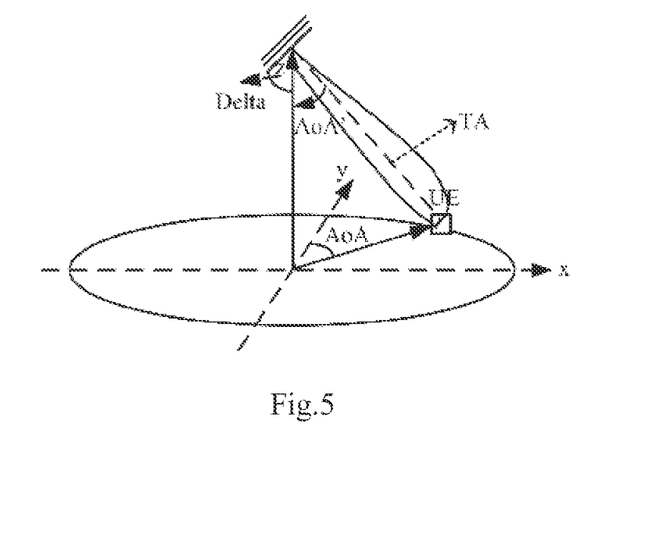
FIG. 5 illustrates a schematic diagram of modification as a result of an inclination angle of an antenna according to an embodiment of the invention.

In an implementation, such a situation may arise that there is a downtilt angle between an antenna of the eNB and the direction perpendicular to the ground, as illustrated in FIG. 5, where the x and y axis are horizontal, the y axis is towards the north, and the z axis is the direction horizontal to the ground (i.e., the direction perpendicular to the x-y plane).

If the antenna is inclined, then there is also an angle of delta between the antenna and the direction perpendicular to the ground (the z axis), so in order to further improve the accuracy at which the AoA' is determined, the AoA' needs to be calculated while this angle is eliminated so that the downtilt angle to the vertical direction can be derived. If the antenna is inclined, then the angle thereof to the z axis (also referred to a down-approaching angle or a downtilt angle) is delta.

The eNB may revise the determined downtilt angle of beam by the downtilt angle between the antenna of the eNB and the direction perpendicular to the ground.

If the downtilt angle of beam is calculated from the measurement on the uplink channel, then the revised downtilt angle of beam can be determined in Equation 3 of:

$$AoA' = \max_{\theta} \sum_{i=1}^{N} |A(\theta) \cdot H_i|^2 - \text{Delta} \quad \text{Equation 3}$$

Reference can be made to Equation 1 for the particular physical meaning of Equation 3.

If the downtilt angle of beam is calculated from the PMI feedback, then the revised downtilt angle of beam can be determined in Equation 4 of:

$$AoA' = \max_{\theta} \sum_{i=1}^{N} |A(\theta) \cdot W_i|^2 - \text{Delta} \quad \text{Equation 4}$$

Reference can be made to Equation 2 for the particular physical meaning of Equation 4.

It shall be noted that if delta is on the same side of the z axis as the UE, then delta is negative, and if delta is on a different side of the z axis from the UE (FIG. 5), then delta is positive.

A measurement flow may vary with a varying application scenario.

In a scenario with a location server, for example, in the operation 301, the eNB receives a measurement request message from the location server to request for a measurement of the downtilt angle of beam and then determines the angle of arrival, the downtilt angle of beam and the timing advance of the UE.

Moreover the eNB transmits the determined angle of arrival, downtilt angle of beam and timing advance to the location server in a measurement response message subsequent to the operation 302.

For example, the measurement request message can be an E-CID Measurement Initiation Request message for details of which reference can be made to Table 1, and then the measurement response message is an E-CID Measurement Report message for details of which reference can be made to Table 2 and Table 3 (Table 3 depicts a part of the contents in a measurement result in Table 2, and if the downtilt angle of beam is reported, then it can be indexed to Table 3).

TABLE 1

| IE/Group Name | Presence | Range | IE type and reference |
|---|---|---|---|
| >Measured quantity | Must (M) | | ENUMERATED (Cell-ID, Angle of Arrival, Timing Advance Type 1, Timing Advance Type 2, RSRP, RSRQ, . . . , Downtilt Angle Of Beam) |

TABLE 2

| IE/Group Name | Presence | Range | IE type and reference |
|---|---|---|---|
| E-CID Measurement Result Measurement result of E-CID positioning | Must (M) | | 9.2.5 |

TABLE 3

| IE/Group Name | Presence | Range | IE type and Reference |
|---|---|---|---|
| Downtilt Angle of Beam | Must (M) | | INTEGER (0 . . . 359) |

In Table 3, the granularity of the downtilt angle of beam is assumed in a unit of 0.5 degree or can be in another precision. The downtilt angle of beam ranges from 0 inclusive to 180 degrees exclusive.

If the embodiment of the invention is applicable to a UMTS, then the eNB notifies a Radio Network Controller (RNC) (where the positioning function is integrated in the RNC) or an SAS server (a standalone SMLC, i.e., a standalone Serving Mobile Location Center, where the positioning function is not integrated in the RNC) of the determined angle of arrival, downtilt angle of beam and timing advance subsequent to the operation 302.

The eNB can position the UE by the determined angle of arrival, downtilt angle of beam and timing advance as desirable.

The eNB can position the UE in the equations of:

$$x\_UE = x\_eNB + m*TA*n*\sin(AoA')*\sin(AoA);$$

$$y\_UE = y\_eNB + m*TA*n*\sin(AoA')*\cos(AoA); \text{ and}$$

$$z\_UE = z\_eNB - m*TA*n*\cos(AoA');$$

Where x_UE represents the coordinate of the UE on the x-axis; y_UE represents the coordinate of the UE on the y-axis; z_UE represents the coordinate of the UE on the z-axis; x_eNB represents the coordinate of the eNB on the x-axis; y_eNB represents the coordinate of the eNB on the y-axis; z_eNB represents the coordinate of the eNB on the z-axis; m represents the ratio of the distance between the UE and the eNB to the distance determined from the TA (e.g., 0.5), and n represents the distance over which light propagates in a unit of time; the TA represents the Timing Advance; the AoA represents the angle of arrival; and the AoA' represents the downtilt angle of beam.

Reference can be made to the 3GPP TS 36.214 and 36.331 protocols for methods in which the eNB determines the angle of arrival and the timing advance, so a repeated description thereof will be omitted here.

In an implementation, the eNB according to the embodiment of the invention can be a macro eNB or a home eNB or a Relay Node (RN) device.

Figure 6:
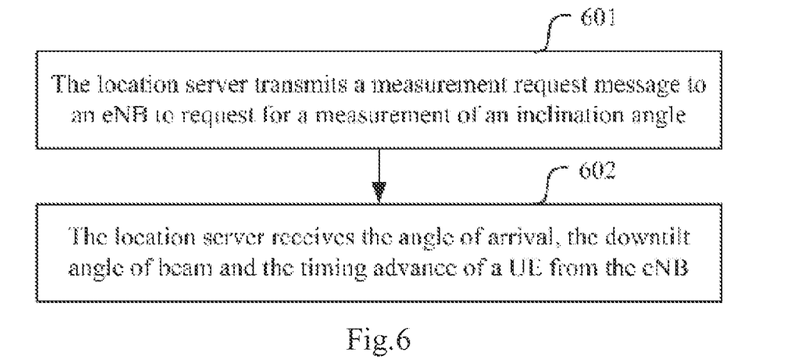
FIG. 6 illustrates a schematic flow chart of a method of receiving position information by a location server according to an embodiment of the invention.

As illustrated in FIG. 6, a method of receiving position information by a location server according to an embodiment of the invention includes the following operations:

In the operation 601, the location server transmits a measurement request message to an eNB to request for a measurement of an downtilt angle of beam; and In the operation 602, the location server receives the angle of arrival, the downtilt angle of beam and the timing advance of a UE from the eNB.

The method may further includes the following operations subsequent to the operation 602:

The location server can position the UE by the received angle of arrival, downtilt angle of beam and timing advance of the UE.

The location server can position the UE in the equations of:

$$x\_UE = x\_eNB + m*TA*n*\sin(AoA')*\sin(AoA);$$

$$y\_UE = y\_eNB + m*TA*n*\sin(AoA')*\cos(AoA); \text{ and}$$

$$z\_UE = z\_eNB - m*TA*n*\cos(AoA');$$

Where x_UE represents the coordinate of the UE on the x-axis; y_UE represents the coordinate of the UE on the y-axis; z_UE represents the coordinate of the UE on the z-axis; x_eNB represents the coordinate of the eNB on the x-axis; y_eNB represents the coordinate of the eNB on the y-axis; z_eNB represents the coordinate of the eNB on the z-axis; m represents the ratio of the distance between the UE and the eNB to the distance determined from the TA, and n represents the distance over which light propagates in a unit of time; the TA represents the Timing Advance; the AoA represents the angle of arrival; and the AoA' represents the downtilt angle of beam.

The location server can further transmit a result of positioning including the longitude and the latitude to the UE or a Location Service (LCS) client after positioning the UE.

If the embodiment of the invention is applicable to an LTE system, then the location server above can alternatively be an evolved serving mobile location center.

Figure 7:
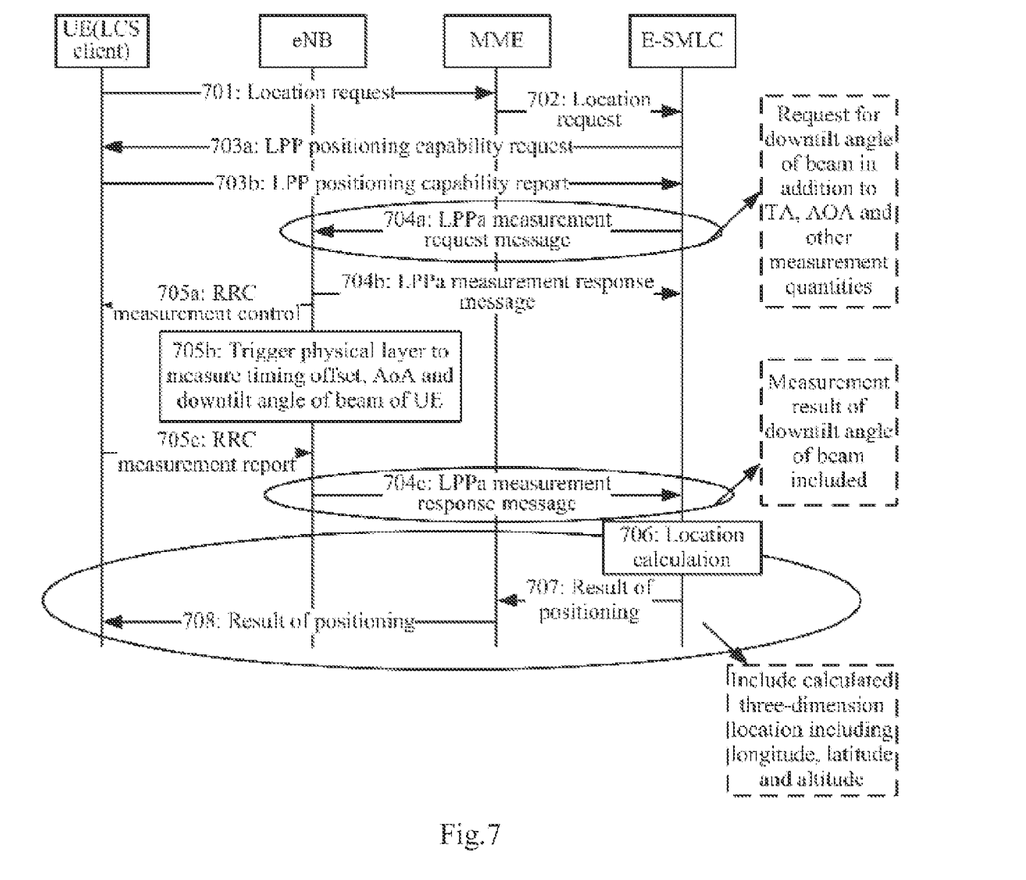
FIG. 7 illustrates a schematic flow chart of a first method of positioning according to an embodiment of the invention.

As illustrated in FIG. 7, a first method of positioning according to an embodiment of the invention includes the following operations:

In the operation 701, a UE initiates a location request to a Mobility Management Entity (MME) in a Non Access Stratum (NAS) message to request for its own position information, or an LCS client can initiate a location request to the MME to request for position information of some UE;

This positioning process can alternatively be initiated by an eNB, and if it is initiated by an eNB, then the first message in FIG. 7 is transmitted by the eNB to the MME.

In the operation 702, the MME initiates a location request to an Enhanced-Serving Mobile Location Center (E-SMLC);

In the operations 703a and 703b, the E-SMLC inquires about and retrieve information about a positioning capability of the UE;

In the operations 704a, 704b and 704c, the E-SMLC retrieves a relevant measurement result of the eNB, including the TA, the AOA and the downtilt angle of beam, and information about a serving cell;

In the operations 705a, 705b and 705c, in response to the request of the E-SMLC, the eNB triggers the TA Type 1, and the eNB receives measurements of the timing offset of a signal of the UE and the AOA and the downtilt angle of beam of the UE;

In the operation 706, the E-SMLC calculates information about the three-dimension location of the UE from the measurement result of the eNB;

In the operation 707, the E-SMLC transmits a result of positioning (i.e., the information about the three-dimension location) to the MME; and In the operation 708, the MME transmits the result of positioning (i.e., the information about the three-dimension location) to the UE or the LCS client.

Figure 8:
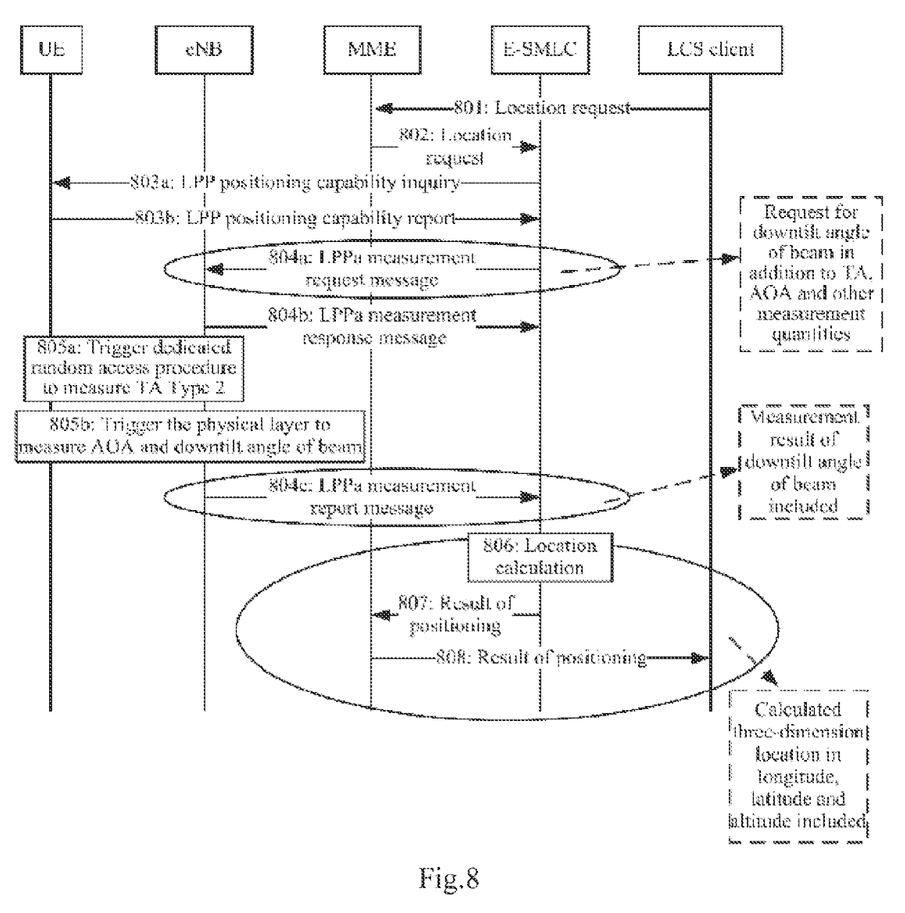
FIG. 8 illustrates a schematic flow chart of a second method of positioning according to an embodiment of the invention.

As illustrates in FIG. 8, a second method of positioning according to an embodiment of the invention includes the following operations:

In the operation 801, some Location Service (LCS) Client initiates a position request to the MME to request for position information of some UE which can be a UE for which a location service is supported or can be a UE for which no location service is supported;

The positioning process can be initiated by an eNB, and if it is initiated by an eNB, then the first message in FIG. 8 is transmitted by the eNB to an MME.

Alternatively the positioning process can be initiated by the UE, and if it is initiated by the UE, then the first message in FIG. 8 is transmitted by the UE to the MME.

In the operation 802, the MME initiates a position request to an E-SMLC;

In the operations 803a and 803b, the E-SMLC inquires about and retrieves information about a positioning capability of the UE; and if no positioning is supported for the UE, then this operation can be skipped;

In the operations 804a, 804b and 804c, the E-SMLC retrieves a relevant measurement result of the eNB, including the downtilt angle of beam, and information about a serving cell;

In the operations 805a and 805b, in response to the request of the E-SMLC, the eNB triggers a dedicated random access procedure to obtain the TA Type 2 and also triggers the physical layer to measure the AOA and the downtilt angle of beam;

In the operation 806, the E-SMLC calculates information about the three-dimension location of the UE from the measurement result (including the downtilt angle of beam) of the eNB and inputs of other aspects;

In the operation 807, the E-SMLC transmits a result of positioning (i.e., the information about the three-dimension location) to the MME; and In the operation 808, the MIME transmits the result of positioning (i.e., the information about the three-dimension location) to an LCS client which may or may not be the positioned UE per se.

Figure 9:
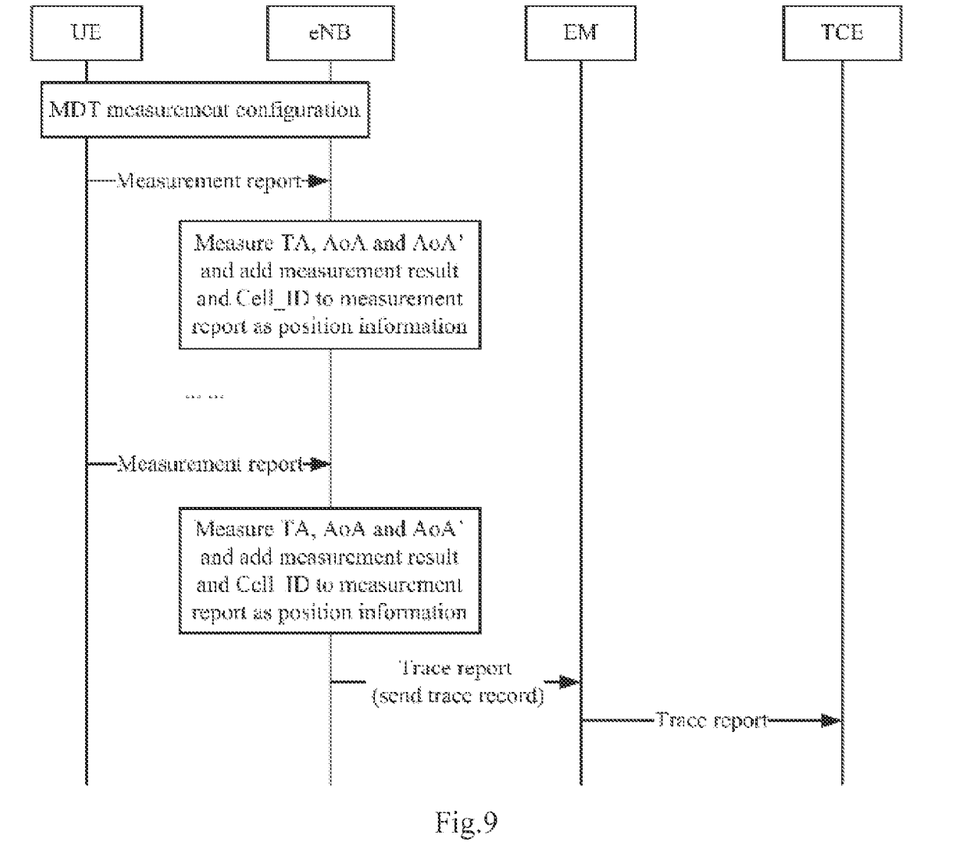
FIG. 9 illustrates a schematic flow chart of an application in a scenario without any location server according to an embodiment of the invention.

In the event that there is no location server, the eNB can also position the UE in this method in another application. In the function of Minimization of Drive-Test (MDT), for example, position information of the UE is typically required to determine the site where a relevant measurement is performed, and the eNB obtains the TA, the AOA and the AoA' by measuring an uplink signal of the UE and transmits such information to a TCE for calculation of a three-dimension location. As illustrated in FIG. 9, there is illustrated a schematic diagram of an application in the scenario where there is no location server.

The eNB selects the UE in a connected state to perform the MDT function and configures the UE with an MDT measurement. The UE reports a result of the MDT measurement, and the network side measures an uplink signal of the UE to obtain the TA, the AOA and the downtilt angle of beam AoA', and in order to guarantee the accuracy of the TA, the eNB can also trigger the UE to transmit a dedicated preamble. The network side adds the TA, the AoA and the downtilt angle of beam AoA', and the identifier Cell_ID of a cell to the MDT measurement report as position information of the UE upon reception of the measurement report. The process above of reporting, measuring and adding the position information is further repeated. The eNB triggers a trace record to be reported after collection over a period of time, where the trace record can be three-dimension position information of the UE calculated by the eNB in the three-dimension position equation or can be the measurement result of the TA, the AoA and the AoA'. In the latter case, the three-dimension position can be calculated by a Trace Control Entity (TCE), or the trace record can be passed to an operator for calculation at the backend.

It shall be noted that the EM in FIG. 9 stands for an Element Management which is a logical function entity. In this flow, the EM is responsible for forwarding the trace record to the TCE.

Based upon the same inventive idea, an embodiment of the invention further provides an evolved Node B (eNB), and since the eNB addresses the problem under a principle similar to the method of determining position information by an eNB according to an embodiment of the invention, reference can be made to the implementation of the method for an implementation of the eNB, so a repeated description thereof will be omitted here.

Figure 10:
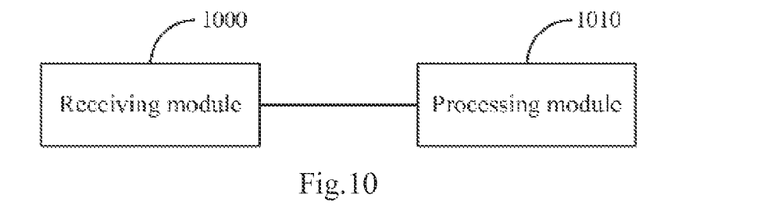
FIG. 10 is a schematic structural diagram of an eNB according to an embodiment of the invention.

As illustrated in FIG. 10, an eNB according to an embodiment of the invention includes a receiving module 1000 and a processing module 1010.

The receiving module 1000 is configured to receive an uplink signal from a UE; and The processing module 1010 is configured to determine the angle of arrival, the downtilt angle of beam and the timing advance of the UE from the received uplink signal.

The processing module 1010 may be configured to determine the downtilt angle of beam as follows:

The downtilt angle of beam is determined from a measurement on an uplink channel; or The downtilt angle of beam is determined from a measurement of a PMI feedback.

The processing module 1010 may determine the downtilt angle of beam from the measurement on the uplink channel in Equation 1.

The processing module 1010 may determine the downtilt angle of beam from the measurement of the PMI feedback in Equation 2.

If there is a downtilt angle between an antenna of the eNB and the direction perpendicular to the ground, then the processing module 1010 may be configured to revise the determined downtilt angle of beam by the downtilt angle between the antenna of the eNB and the direction perpendicular to the ground after determining the downtilt angle of beam.

The processing module 1010 may be configured to determine the angle of arrival, the downtilt angle of beam and the timing advance of the UE upon reception of a measurement request information from a location server to request for a measurement of the downtilt angle of beam; and to transmit the determined angle of arrival, downtilt angle of beam and timing advance to the location server in a measurement response message.

The processing module 1010 may be configured to notify an RNC or an SAS server of the determined angle of arrival, downtilt angle of beam and timing advance after determining the angle of arrival, the downtilt angle of beam and the timing advance of the UE.

The processing module 1010 may be configured to position the UE by the determined angle of arrival, downtilt angle of beam and timing advance of the UE after determining the angle of arrival, the downtilt angle of beam and the timing advance of the UE.

The processing module 1010 may be configured to position the UE in the equations of:

$$x\_UE = x\_eNB + m*TA*n*\sin(AoA')*\sin(AoA);$$

$$y\_UE = y\_eNB + m*TA*n*\sin(AoA')*\cos(AoA); \text{ and}$$

$$z\_UE = z\_eNB - m*TA*n*\cos(AoA');$$

Where x_UE represents the coordinate of the UE on the x-axis; y_UE represents the coordinate of the UE on the y-axis; z_UE represents the coordinate of the UE on the z-axis; x_eNB represents the coordinate of the eNB on the x-axis; y_eNB represents the coordinate of the eNB on the y-axis; z_eNB represents the coordinate of the eNB on the z-axis; m represents the ratio of the distance between the UE and the eNB to the distance determined from the TA, and n represents the distance over which light propagates in a unit of time; the TA represents the Timing Advance; the AoA represents the angle of arrival; and the AoA' represents the downtilt angle of beam.

The eNB in this embodiment may include in hardware a signal transceiver configured to communicate with the UE and a Central Processing Unit (CPU) configured to process information, where the receiving module above in this embodiment is embodied as the a signal transceiver, and the processing module above is embodied by the central processing unit.

Based upon the same inventive idea, an embodiment of the invention further provides a location server, and since the location server addresses the problem under a principle similar to the method of receiving position information by a location server according to an embodiment of the invention, reference can be made to the implementation of the method for an implementation of the location server, so a repeated description thereof will be omitted here.

Figure 11:
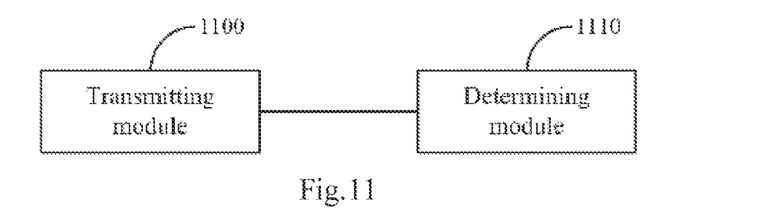
FIG. 11 is a schematic structural diagram of a location server according to an embodiment of the invention.

As illustrated in FIG. 11, a location server according to an embodiment of the invention includes a transmitting module 1100 and a determining module 1110.

The transmitting module 1100 is configured to transmit a measurement request message to an eNB to request for a measurement of an downtilt angle of beam; and The determining module 1110 is configured to receive the angle of arrival, the downtilt angle of beam and the timing advance of a UE from the eNB.

The determining module 1110 may be configured to position the UE by the received angle of arrival, downtilt angle of beam and timing advance of the UE.

The determining module 1110 may be configured to position the UE in the equations of:

$$x\_UE = x\_eNB + m*TA*n*\sin(AoA')*\sin(AoA);$$

$$y\_UE = y\_eNB + m*TA*n*\sin(AoA')*\cos(AoA); \text{ and}$$

$$z\_UE = z\_eNB - m*TA*n*\cos(AoA');$$

Where x_UE represents the coordinate of the UE on the x-axis; y_UE represents the coordinate of the UE on the y-axis; z_UE represents the coordinate of the UE on the z-axis; x_eNB represents the coordinate of the eNB on the x-axis; y_eNB represents the coordinate of the eNB on the y-axis; z_eNB represents the coordinate of the eNB on the z-axis; m represents the ratio of the distance between the UE and the eNB to the distance determined from the TA, and n represents the distance over which light propagates in a unit of time; the TA represents the Timing Advance; the AoA represents the angle of arrival; and the AoA' represents the downtilt angle of beam.

The determining module 1110 may be configured to transmit a result of positioning including the longitude and the latitude to the UE or an LCS client after positioning the UE.

The location server in this embodiment may include in hardware a communicator configured to communicate with the eNB, the UE and the LCS client and a Central Processing Unit (CPU) configured to process information, where the following functions of the transmitting module and the determining module above in this embodiment are performed by the communicator: the angle of arrival, the downtilt angle of beam and the timing advance of the UE from the eNB is received; and the result of positioning including the longitude and the latitude is transmitted to the UE or the LCS client after the UE is positioned.

The following function of the determining module is performed by the central processing unit: the UE is positioned by the received angle of arrival, downtilt angle of beam and timing advance of the UE.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational operations are performed on the computer or the other programmable data processing device to create a computer implemented process so that the instructions executed on the computer or the other programmable device provide operations for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of determining position information, wherein the method comprises:
    receiving, by an evolved Node B (eNB), an uplink signal from a User Equipment (UE);
    determining, by the eNB, an angle of arrival, a downtilt angle of beam and a timing advance of the UE from the received uplink signal; and
    positioning, by the eNB, the UE using the angle of arrival, downtilt angle of beam and timing advance of the UE;
    wherein the eNB positions the UE using the equations of:

$$x\_UE = x\_eNB + m*TA*n*\sin(AoA')*\sin(AoA);$$

$$y\_UE = y\_eNB + m*TA*n*\sin(AoA')*\cos(AoA); \text{ and}$$

$$z\_UE = z\_eNB - m*TA*n*\cos(AoA');$$

wherein x_UE represents the coordinate of the UE on the x-axis; y_UE represents the coordinate of the UE on the y-axis; z_UE represents the coordinate of the UE on the z-axis; x_eNB represents the coordinate of the eNB on the x-axis; y_eNB represents the coordinate of the eNB on the y-axis; z_eNB represents the coordinate of the eNB on the z-axis; m represents the ratio of the distance between the UE and the eNB to the distance determined from the TA, and n represents the distance over which light propagates in a unit of time the TA represents the Timing Advance; the AoA represents the angle of arrival; and the AoA' represents the downtilt angle of beam.

2. The method of claim 1, wherein determining the downtilt angle of beam comprises:
the eNB determining the downtilt angle of beam from a measurement on an uplink channel; or
the eNB determining the downtilt angle of beam from a measurement of a Pre-coding Matrix Indicator (PMI) feedback.

3. The method of claim 2, wherein the eNB determines the downtilt angle of beam from the measurement on the uplink channel in the equation of:

$$AoA' = \max_{\theta} \sum_{i=1}^{N} |A(\theta) \cdot H_i|^2,$$

wherein AoA' represents the downtilt angle of beam; $A(\theta)$ represents a directional vector corresponding to the downtilt angle of beam, and $$A(\theta) = \left(1, e^{-j\frac{2\pi d \sin(\theta)}{\lambda}}, \ldots, e^{-j\frac{2\pi d (M-1)\sin(\theta)}{\lambda}}\right)_{1 \times M},$$

M represents the number of rows of antennas in an array of antennas, N represents the number of columns of antennas in the array of antennas, and d represents the distance between vertical array elements in the array of antennas of the eNB; and $H=(H_1, \ldots, H_N)^*$ represents an uplink channel matrix, wherein $H_i$ represents the i-th column of the channel matrix $(H_1, \ldots, H_N)$, and $(\bullet)^*$ represents conjugation; or
the eNB determines the downtilt angle of beam from the measurement of the PMI feedback in the equation of:

$$AoA' = \max_{\theta} \sum_{i=1}^{N} |A(\theta) \cdot W_i|^2,$$

wherein AoA' represents the downtilt angle of beam; $A(\theta)$ represents a directional vector corresponding to the downtilt angle of beam, and $$A(\theta) = \left(1, e^{-j\frac{2\pi d \sin(\theta)}{\lambda}}, \ldots, e^{-j\frac{2\pi d (M-1)\sin(\theta)}{\lambda}}\right)_{1 \times M};$$

M represents the number of rows of antennas in a virtual array of antennas, N represents the number of columns of antennas in the virtual array of antennas, and d represents the distance between vertical array elements in the array of antennas of the eNB; and $W_i$ represents the i-th vertical dimension PMI reported by the UE.

4. The method of claim 2, wherein there is a downtilt angle between an antenna of the eNB and the direction perpendicular to the ground, and the method further comprises:
the eNB adjusting the determined downtilt angle of beam based on the downtilt angle between the antenna of the eNB and the direction perpendicular to the ground.

5. The method of claim 1, wherein determining the angle of arrival, the downtilt angle of beam and the timing advance of the UE comprises:
the eNB receiving a measurement request message from a location server to request for a measurement of the downtilt angle of beam;
the eNB determining the angle of arrival, the downtilt angle of beam and the timing advance of the UE; and
the eNB transmitting the angle of arrival, downtilt angle of beam and timing advance to the location server in a measurement response message.

6. The method of claim 1, wherein after the eNB determines the angle of arrival, the downtilt angle of beam and the timing advance of the UE, the method further comprises:
the eNB notifying a Radio Network Controller (RNC) or a standalone serving Mobile Location Center (SAS) server of the determined angle of arrival, downtilt angle of beam and timing advance.

7. A method of determining position information, the method comprising:
transmitting, by a location server, a measurement request message to an evolved Node B (eNB) to request a measurement of a downtilt angle of beam;
receiving, by the location server, an angle of arrival, the downtilt angle of beam and a timing advance of a UE from the eNB; and
positioning, by the location server, the UE using the angle of arrival, downtilt angle of beam and timing advance of the UE;
wherein the location server positions the UE using the equations of:

$x\_UE=x\_eNB+m*TA*n*\sin(AoA')*\sin(AoA);$ $y\_UE=y\_eNB+m*TA*n*\sin(AoA')*\cos(AoA);$ and $z\_UE=z\_eNB-m*TA*n*\cos(AoA');$ wherein x_UE represents the coordinate of the UE on the x-axis; y_UE represents the coordinate of the UE on the y-axis; z_UE represents the coordinate of the UE on the z-axis; x_eNB represents the coordinate of the eNB on the x-axis; y_eNB represents the coordinate of the eNB on the y-axis; z_eNB represents the coordinate of the eNB on the z-axis; m represents the ratio of the distance between the UE and the eNB to the distance determined from the TA, and n represents the distance over which light propagates in a unit of time the TA represents the Timing Advance; the AoA represents the angle of arrival; and the AoA' represents the downtilt angle of beam.

8. The method of claim 7, wherein after the location server positions the UE, the method further comprises:
the location server transmitting a result of positioning comprising a longitude and a latitude to the UE or a Location Service (LCS) client.

9. An evolved Node B (eNB) for determining position information, the eNB comprising:
one or more processors; and
a memory storing computer program instructions, the computer program instructions, when executed by the one or more processors, cause the eNB to:

receive an uplink signal from a User Equipment (UE);
determine an angle of arrival, a downtilt angle of beam and a timing advance of the UE from the received uplink signal; and
position the UE using the determined angle of arrival, downtilt angle of beam and timing advance of the UE;
wherein the computer program instructions, when executed by the one or more processors, cause the eNB position the UE using the equations of:

x_UE=x_eNB+$m$*TA*$n$*sin(AoA')*sin(AoA);

y_UE=y_eNB+$m$*TA*$n$*sin(AoA')*cos(AoA); and z_UE=z_eNB−$m$*TA*$n$*cos(AoA');

wherein x_UE represents the coordinate of the UE on the x-axis; y_UE represents the coordinate of the UE on the y-axis; z_UE represents the coordinate of the UE on the z-axis; x_eNB represents the coordinate of the eNB on the x-axis; y_eNB represents the coordinate of the eNB on the y-axis; z_eNB represents the coordinate of the eNB on the z-axis; m represents the ratio of the distance between the UE and the eNB to the distance determined from the TA, and n represents the distance over which light propagates in a unit of time the TA represents the Timing Advance; the AoA represents the angle of arrival; and the AoA' represents the downtilt angle of beam.

10. The eNB of claim 9, wherein in determining the downtilt angle of beam, the computer program instructions, when executed by the one or more processors, cause the eNB:
to determine the downtilt angle of beam from a measurement on an uplink channel; or
to determine the downtilt angle of beam from a measurement of a Pre-coding Matrix Indicator (PMI) feedback.

11. The eNB of claim 10, wherein the computer program instructions, when executed by the one or more processors, cause the eNB to determine the downtilt angle of beam from the measurement on the uplink channel using the equation of:

$$AoA' = \max_\theta \sum_{i=1}^{N} |A(\theta) \cdot H_i|^2,$$

wherein AoA' represents the downtilt angle of beam; A(θ) represents a directional vector corresponding to the downtilt angle of beam, and $$A(\theta) = \left(1, e^{-j\frac{2\pi d \sin(\theta)}{\lambda}}, \ldots, e^{-j\frac{2\pi d(M-1)\sin(\theta)}{\lambda}}\right)_{1 \times M},$$

M represents the number of rows of antennas in an array of antennas, N represents the number of columns of antennas in the array of antennas, and d represents the distance between vertical array elements in the array of antennas of the eNB; and H=(H$_1$, . . . , H$_N$)* represents an uplink channel matrix, wherein H$_i$ represents the i-th column of the channel matrix (H$_1$, . . . , H$_N$), and (•)* represents conjugation; or
the processing module is configured to determine the downtilt angle of beam from the measurement of the PMI feedback in the equation of:

$$AoA' = \max_\theta \sum_{i=1}^{N} |A(\theta) \cdot W_i|^2,$$

wherein AoA' represents the downtilt angle of beam; A(θ) represents a directional vector corresponding to the downtilt angle of beam, and $$A(\theta) = \left(1, e^{-j\frac{2\pi d \sin(\theta)}{\lambda}}, \ldots, e^{-j\frac{2\pi d(M-1)\sin(\theta)}{\lambda}}\right)_{1 \times M};$$

M represents the number of rows of antennas in a virtual array of antennas, N represents the number of columns of antennas in the virtual array of antennas, and d represents the distance between vertical array elements in the array of antennas of the eNB; and W$_i$ represents the i-th vertical dimension PMI reported by the UE.

12. The eNB of claim 10, wherein the computer program instructions, when executed by the one or more processors, cause the eNB:
if there is a downtilt angle between an antenna of the eNB and the direction perpendicular to the ground, to adjust the determined downtilt angle of beam using the downtilt angle between the antenna of the eNB and the direction perpendicular to the ground.

13. The eNB of claim 9, wherein the computer program instructions, when executed by the one or more processors, cause the eNB:
to determine the angle of arrival, the downtilt angle of beam and the timing advance of the UE upon reception of a measurement information request from a location server requesting a measurement of the downtilt angle of beam; and
to transmit the angle of arrival, downtilt angle of beam and timing advance to the location server in a measurement response message.

14. The eNB of claim 9, wherein the computer program instructions, when executed by the one or more processors, cause the eNB:
to notify a Radio Network Controller (RNC) or a stand-alone serving Mobile Location Center (SAS) server of the angle of arrival, downtilt angle of beam and timing advance.

* * * * *